United States Patent
Boguslawski et al.

(10) Patent No.: US 8,493,679 B1
(45) Date of Patent: *Jul. 23, 2013

(54) DISK DRIVE IMPLEMENTING A READ CHANNEL OPTIMIZATION PROCESS

(75) Inventors: Douglas M. Boguslawski, Lyons, CO (US); Kameron Kam-Wai Jung, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,854

(22) Filed: Sep. 5, 2012

Related U.S. Application Data

(63) Continuation of application No. 12/895,443, filed on Sep. 30, 2010.

(51) Int. Cl.
*G11B 27/36* (2006.01)
*G11B 5/09* (2006.01)

(52) U.S. Cl.
USPC .............................................. 360/31; 360/46

(58) Field of Classification Search
None
See application file for complete search history.

(56) References Cited

U.S. PATENT DOCUMENTS

| | | |
|---|---|---|
| 7,158,324 B2 | 1/2007 | Stein et al. |
| 7,583,458 B2 | 9/2009 | Annampedu et al. |
| 8,310,775 B1 | 11/2012 | Boguslawski et al. |
| 2006/0061496 A1 | 3/2006 | Stein et al. |
| 2006/0171049 A1 | 8/2006 | Dati et al. |
| 2008/0089446 A1 | 4/2008 | Lee et al. |

OTHER PUBLICATIONS

Office Action dated Apr. 2, 2012 from U.S. Appl. No. 12/895,443, 13 pages.
Notice of Allowance dated Jul. 13, 2012 from U.S. Appl. No. 12/895,443, 7 pages.

*Primary Examiner* — Regina N Holder

(57) ABSTRACT

A disk drive is disclosed comprising a disk including a plurality of tracks, a head actuated over the disk, and control circuitry. The control circuitry is operable to: write a target track including a plurality of data wedges; determine optimization metrics for the data wedges of the plurality of data wedges as the data wedges are read; store the optimization metrics for the data wedges from the target track; and remove a first portion and a second portion of the optimization metrics such that a remaining portion of the optimization metrics remains. Further, the control circuitry is operable to calculate an average optimization metric value for the remaining portion of optimization metrics for use in read channel optimization.

20 Claims, 5 Drawing Sheets

| | | | | | |
|---|---|---|---|---|---|
| 1ST TRACK READ 402 | WEDGE 1 OPTIMIZATION METRIC | WEDGE 2 OPTIMIZATION METRIC | WEDGE 3 OPTIMIZATION METRIC | WEDGE N OPTIMIZATION METRIC | AVERAGE OPTIMIZATION METRIC FOR TRACK READ |
| 2ND TRACK READ 404 | ... | ... | ... | ... | ... |
| | ... | ... | ... | ... | ... |
| | ... | ... | ... | ... | ... |
| NTH TRACK READ 410 | WEDGE 1 OPTIMIZATION METRIC | | | WEDGE N OPTIMIZATION METRIC | AVERAGE OPTIMIZATION METRIC FOR TRACK READ |

403 · 405 · 420

REMOVED OPTIMIZATION METRIC 407

| CTF DAC VALUE | WDG 1 | WDG 2 | WDG 3 | WDG 4 | WDG 5 | WDG 6 | WDG 7 | WDG 8 | WDG 9 | WDG 10 | AVG AFTER SUB MIN & MAX |
|---|---|---|---|---|---|---|---|---|---|---|---|
| 0 | 1197 | 1183 | 1180 | 1186 | 1187 | 1186 | 1196 | 1196 | 1185 | 1181 | 1187.5 |
| 1 | 1145 | 1145 | 1147 | 1140 | 1146 | 1145 | 1137 | 1135 | 1130 | 1142 | 1141.875 |
| 2 | 1096 | 1088 | 1084 | 1089 | 1094 | 1088 | 1085 | 1093 | 1097 | 1098 | 1091.25 |
| 3 | 1035 | 1036 | 1034 | 1030 | 1033 | 1042 | 1034 | 1048 | 1043 | 1039 | 1037 |
| 4 | 997 | 980 | 993 | 999 | 999 | 997 | 984 | 987 | 996 | 996 | 993.625 |
| 5 | 931 | 937 | 932 | 940 | 945 | 946 | 943 | 945 | 933 | 947 | 940.125 |
| 6 | 896 | 883 | 886 | 886 | 899 | 899 | 899 | 885 | 880 | 891 | 890.625 |
| 7 | 937 | 946 | 949 | 946 | 931 | 947 | 934 | 947 | 942 | 941 | 942.5 |
| 8 | 980 | 997 | 990 | 988 | 982 | 991 | 936 | 997 | 993 | 985 | 990.25 |
| 9 | 1036 | 1047 | 1041 | 1043 | 1044 | 1039 | 1043 | 1035 | 1042 | 1030 | 1040.375 |
| 10 | 1098 | 1088 | 1099 | 1097 | 1094 | 1090 | 1097 | 1082 | 1099 | 1094 | 1094.625 |
| 11 | 1130 | 1135 | 1134 | 1144 | 1138 | 1145 | 1147 | 1147 | 1147 | 1149 | 1142.125 |
| 12 | 1195 | 1181 | 1185 | 1191 | 1180 | 1188 | 1196 | 1197 | 1184 | 1189 | 1188.625 |
| 13 | 1249 | 1232 | 1243 | 1232 | 1240 | 1241 | 1237 | 1249 | 1231 | 1243 | 1239.625 |
| 14 | 1292 | 1283 | 1283 | 1294 | 1299 | 1282 | 1296 | 1291 | 1290 | 1295 | 1290.5 |
| 15 | 1349 | 1331 | 1334 | 1347 | 1333 | 1348 | 1338 | 1346 | 1344 | 1341 | 1341.375 |

BEST AVERAGE OPTIMIZATION METRIC ROW 530

DISK DRIVE IMPLEMENTING A READ CHANNEL OPTIMIZATION PROCESS

CROSS-REFERENCE TO RELATED APPLICATIONS

This application is a continuation of co-pending U.S. patent application Ser. No. 12/895,443 filed Sep. 30, 2010, the entire contents of which are incorporated herein by reference.

BACKGROUND

Today, computing devices such as personal computers, laptop computers, personal digital assistants, cell-phones, etc., are routinely used at work, home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices such as desktop computers, laptop computers, as well as small form factor (SFF) disk drives for use in mobile computing devices (e.g., personal digital assistants (PDAs), cell-phones, digital cameras, etc.). To be competitive, a disk drive should be relatively inexpensive and provide substantial capacity, rapid access to data, and reliable performance.

Disk drives typically comprise a disk and a head connected to a distal end of an actuator arm which is rotated by a pivot by a voice coil motor (VCM) to position the head radially over the disk. The disk typically comprises a plurality of radially spaced, concentric tracks for recording user data sectors and servo sectors. The servo sectors typically comprise head positioning information (e.g., a track address) which is read by the head and processed by a servo control system to control the velocity of the actuator arm as it seeks from track to track.

Data is typically written to the disk by modulating a write current in an inductive coil to record magnetic transitions onto the disk surface. During readback, the magnetic transitions are sensed by a read element (e.g., a magnetoresistive element) and the resulting read signal demodulated by a suitable read channel.

Further, the read channel typically utilizes read channel filters in order to maximize the reliability of the readback of data. It is therefore desirable to select optimal values for use by the read channel filter.

BRIEF DESCRIPTION OF THE DRAWINGS

FIG. 4 is an example of a table showing optimization metrics for data wedges that have been stored, according to one embodiment of the invention.

FIG. 5 is an example of a table showing VMM optimization metrics for data wedges that have been stored, according to one embodiment of the invention.

DETAILED DESCRIPTION

Figure 1:
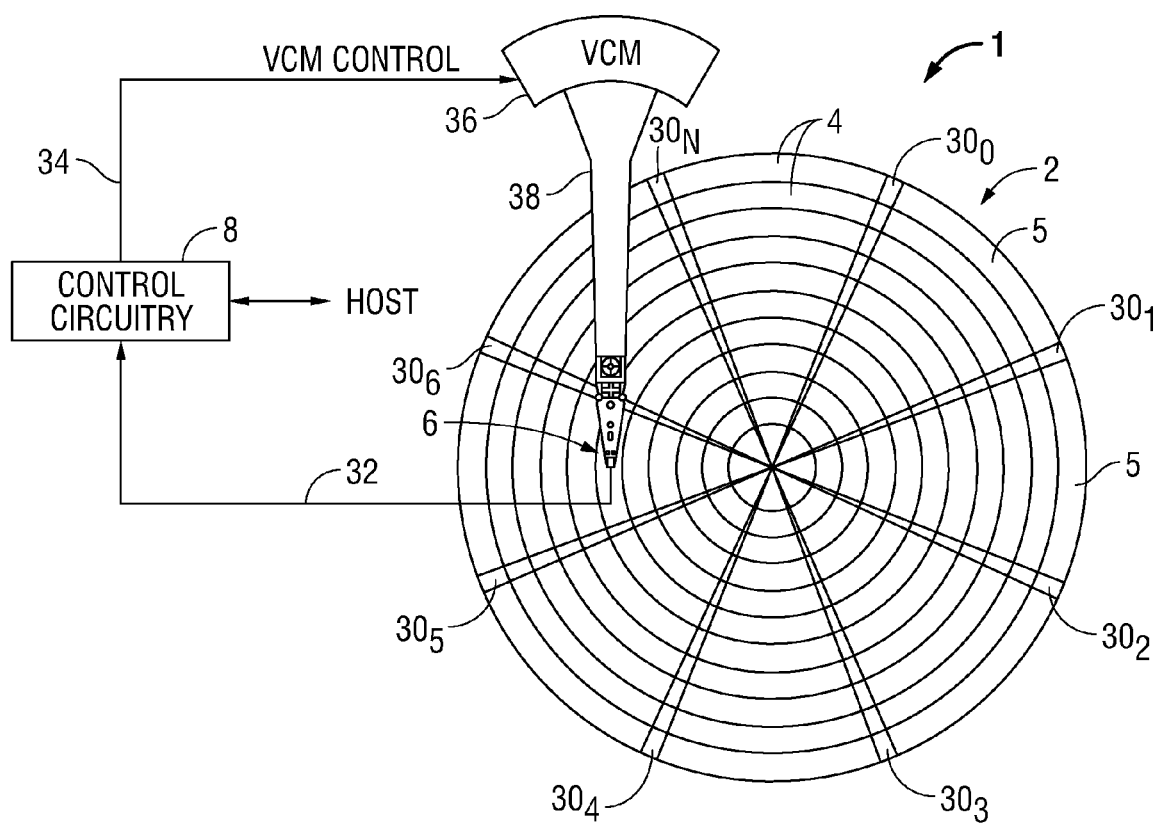
FIG. 1 shows a disk drive according to one embodiment of the invention.

FIG. 1 shows a disk drive 1 according to one embodiment of the invention comprising a disk 2 having a plurality of tracks 4 and a head 6 actuated over the disk 2. The disk drive further comprises control circuitry 8 operable to implement a read channel optimization process.

In one embodiment, disk 2 comprises a plurality of embedded servo sectors $30_0$-$30_N$ which define the plurality of tracks 4. Each servo sector $30_i$ comprises head positioning information such as a track address for course positioning during seeks and servo bursts for fine positioning while tracking the centerline of a target track during write/read operations. Further, each of the tracks 4 include data sectors 5 between each of the servo sectors $30_i$. The control circuitry 8 processes a read signal 32 emanating from the head 6 to demodulate the servo sectors into a position error signal (PES). The PES is filtered with a suitable compensation filter to generate a control signal 34 applied to a voice coil motor (VCM) 36 which rotates an actuator arm 38 of an actuator assembly about a pivot in a direction that reduces the PES.

Figure 2:
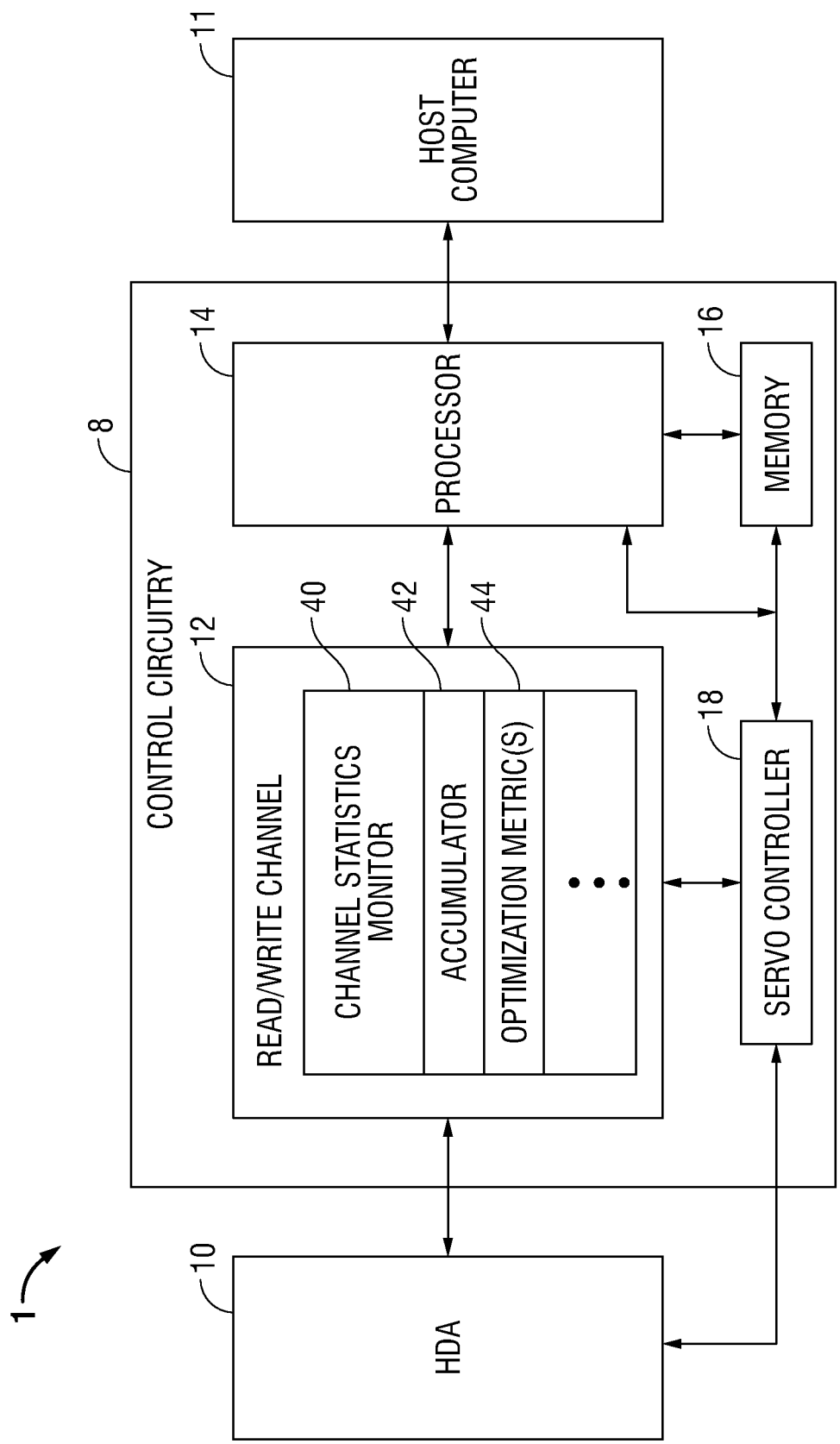
FIG. 2 shows a simplified block diagram of components of a disk drive in which embodiments of the invention may be practiced.

With reference also to FIG. 2, FIG. 2 shows a simplified block diagram of components of disk drive 1 in which embodiments of the invention may be practiced. Disk drive 1 may comprise a Head Disk Assembly (HDA) 10 and control circuitry 8 that may be implemented in a printed circuit board assembly (PCBA). Control circuitry 8 may be coupled to a host computer 11 such as a desktop computer, a laptop computer, a mobile computing device (e.g., PDA, camera, cell-phone, etc.), or any type of computing device.

HDA 10 may comprise one or more disk(s) 2, a spindle motor for rapidly spinning each disk 2 on a spindle, and an actuator assembly including a VCM 36 and an actuator arm 38 for moving one or more head(s) 6 in unison over disk(s) 2, as previously described. Further, as previously described, disk(s) 2 may be formatted with servo sectors 30, and data sectors 5. Control circuitry 8 may comprise a read/write channel 12, a processor 14, a memory 16, and a servo controller 18.

Host initiated operations for reading and writing data for disk drive 1 may be executed under the control of processor 14 connected to the read/write channel 12, servo controller 18, and memory arrays 16. For example, program code executed by processor 14 may be stored in non-volatile memory and random access memory (RAM) 16. Program overlay code stored on reserved tracks 4 of disk 2 may also be loaded into memory 16 as required for execution.

During disk read and write operations, data transferred by HDA 10 may be encoded and decoded by read/write channel 12. For example, during read operations, read/write channel 12 may decode data into digital bits for use by processor 14. During write operations, processor 14 may provide digital data to read/write channel 12 which encodes the data prior to its transmittal to HDA 10.

Further, processor 14 may operate as a disk controller for formatting and providing error detection and correction of disk data, a host interface controller for responding to commands from host 11, and a buffer controller for storing data which is transferred between disk(s) 2 and host 11.

Servo controller 18 provides an interface between processor 14 and HDA 10. Processor 14 may command logic in servo controller 18 to position actuator arm 38 and head 6 using VCM driver 36 and to precisely control the rotation of a spindle motor to spin the disk(s) 2.

Disk drive 1 may employ a sampled servo system in which equally spaced servo sector $30_i$ is recorded on each track 4 of each disk 2. Data sectors 5 are recorded in the intervals between the servo sectors on each track. Servo sectors 30, may be sampled at regular intervals by servo controller 18 to provide servo position information to processor 14. Servo sectors 30, may be received by read/write channel 12 and are processed by servo controller 18 to provide position information to processor 14. It should be appreciated that this is a simplified description of a disk drive and that many different types of disk drive implementations may be implemented in accordance with embodiments of the invention.

In one embodiment, control circuitry 8 may be operable to command the writing of a target track 4 including a plurality of data wedges 5 and to determine optimization metrics for the data wedges 5 as the plurality of data wedges are read. Further, control circuitry 8 may command that the optimization metrics from the read data wedges 5 from the target track 4 be stored in memory. Additionally, in order to optimize this read channel optimization process, a first portion and a second portion of the optimization metrics may be removed such that a remaining portion of optimization metrics remain and an average optimization metric value for the remaining portion of the optimization metrics may be calculated and used in read channel optimization. In particular, the average optimization metric value may be used to select an optimal read channel filter having an optimal frequency that is used by the read channel 12 to improve read operations.

In one embodiment, control circuitry 8 may include a read/write channel 12 that includes a channel statistics monitor 40 implement this functionality. The channel statistics monitor 40 may include an accumulator 42 that determines the optimization metric for each data wedge 5 as the data wedge is read and stores the optimization metric 44 in a table, as will be described.

In one embodiment, the optimization metrics 44 for the data wedges 5 are determined and stored based upon one revolution of reading the target track 4 of the disk 2. For example, the optimization metric 44 may be a Viterbi margin metric (VMM) or the optimization metric 44 may be a mean square error (MSE) metric. As will be described, the optimization metrics for the read data wedges may be stored in a table format.

Figure 3:
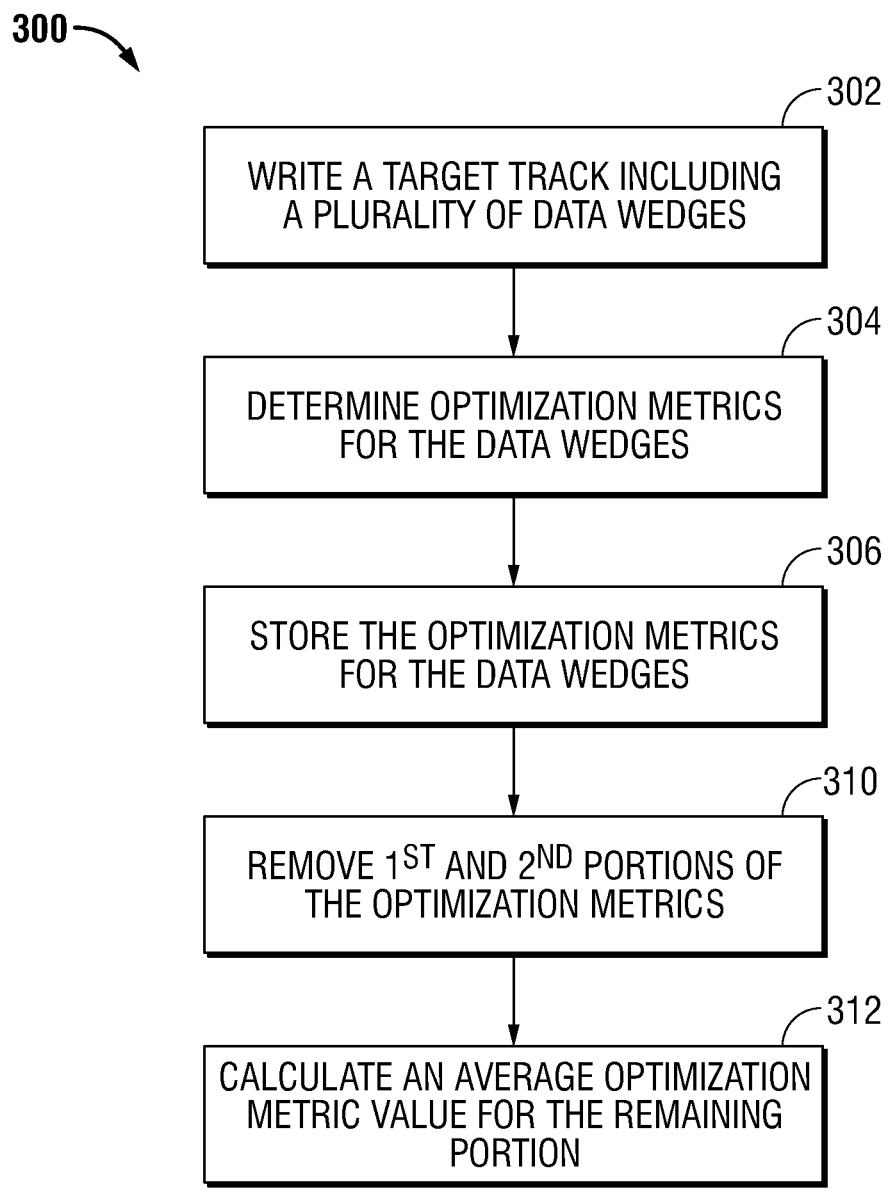
FIG. 3 is a flow diagram illustrating a process to optimize read channel operations for a disk drive, according to one embodiment of the invention.

With reference to FIG. 3, FIG. 3 is a flow diagram illustrating a process 300 to optimize read channel operations for a disk drive, according to one embodiment of the invention. For example, a target track including a plurality of data wedges is written to a disk (block 302). Next, optimization metrics are determined for the data wedges as the data wedges are read (block 304). The optimization metrics that have been determined for the data wedges are stored (block 306).

Based upon the stored optimization metrics for the data wedges, first and second portions of these optimization metrics are removed (block 310). Next, an average optimization metric value for the remaining portion of the optimization metrics is calculated (block 312). As an example, the average optimization metric value may be used to select an optimal read channel filter having an optimal frequency that is used by the read channel to improve read data operations during operation of the disk drive.

With reference to FIG. 4, FIG. 4 is a table 400 illustrating optimization metrics for data wedges that have been read, calculated, and stored, according to one embodiment of the invention. As an example, an entire track of a disk may be written with a plurality of data wedges. The disk drive implementing the channel statistics monitor may read the entire target track to determine optimization metrics for each of the data wedges as they are read and store them in a table. As shown in FIG. 4, for a first track read 402, the optimization metric for wedge 1 may be calculated and stored (403) along with all the other data wedges up to wedge N (405); the value N depending upon how many data wedges have been written. Thus, each optimization metric may be determined and stored for each read data wedge.

In this example, the calculated wedge 1 optimization metric 403 is shown all the way through the calculated wedge N optimization metric 405 for the first track read 402. Thus, these optimization metrics 403-405 are stored in table 400. Further, dependent upon testing process implementation, the track may be read a predetermined number of times. As shown in FIG. 4, a second track read 404 may be performed and the optimization metrics for each data wedge stored similar to the first track read. The track may be similarly read a predetermined number of times (e.g. N times—shown by Nth track read 410). Further, for each track read an average optimization metric value 420 for the entire track read is calculated and stored in the table 400.

In one embodiment, for each track read, a first portion and a second portion of the optimization metrics may be removed (e.g., shown as removed optimization metrics 407) such that only a remaining portion of the optimization metrics remain which is then used to calculate the average optimization metric value 420. As an example, the first portion of the optimization metrics removed may be approximately fifteen percent of the highest value optimization metrics and a second portion of the optimization metrics removed may be approximately fifteen percent of the lowest value optimization metrics. Thus, as an example, if there are one hundred data wedges written such that wedge N equals 100, for a given track read, to determine the associated wedge optimization metrics, fifteen percent of the lowest value optimization metrics will be removed and fifteen percent of the highest value optimization metrics will be removed (e.g., resulting in thirty removed optimization metrics 407) such that seventy of the optimization metrics remain as remainder optimization metrics that are then used to calculate the average optimization metric value for the track read 420.

It should be appreciated that dependent upon testing process considerations, any percentage of high value and low value optimization metrics may be removed, such as, ten percent, twenty percent, thirty percent, etc. Further, other implementations may also be utilized such as a first portion of the optimization metrics removed may be below a standard deviation of the optimization metrics and a second portion of optimization metrics removed may be above a standard deviation of the optimization metrics in order to calculate the average optimization metric value.

Thus, an optimization metric (e.g., a VMM or MSE metric) may be calculated and accumulated by the accumulator 42 with the channel statistics monitor 40 of the read/write channel 12 one wedge at a time and stored as single wedge optimization metric data (e.g. wedge 1 optimization metric 403 . . . wedge N optimization metric 405) in a wedge table 400 wherein the accumulator is reset every time a data wedge is read and calculated and an average optimization metric value is determined for an entire track revolution read. This may be done for multiple track reads (e.g., first track read 402, second track read 404 . . . ends at track read N 410).

Also, for each track read, a first portion of high value optimization metrics may be removed and a second portion of low value optimization metrics may be removed (e.g., removed optimization metrics 407) and the average remaining optimization metrics may be utilized to determine an average optimization metric for each track read 420. By utilizing this methodology, wedge data optimization metrics that are calculated based upon the reading of data wedges, which may be reflective of anomalies based upon such things as off-track reads and disk media flaws, may be removed such that a better average optimization metric 420 for the track read may be determined.

By utilizing this previously-described methodology, during the testing of a disk drive, these read channel optimization techniques based upon writing a target track including a plurality of data wedges; determining optimization metrics for the data wedges as the data wedges are read; storing the optimization metrics for the data wedges (e.g., wedge 1 optimization metric 403 . . . wedge N optimization metric 405); removing first and second portions of the optimization metrics (e.g., removed optimization metrics 407) that may be reflective of anomalies; and then calculating an average optimization metric value 420 based upon the remaining portion of optimization metrics provides a method for improved read channel optimization. This determination of an average optimization metric value 420 may be done for a pre-determined number of track reads (e.g. track read 402 . . . track read N 410) such that a best optimization metric value may be found from the plurality of track reads for use in selecting an optimal read channel filter having an optimal frequency that is used by the read channel for the reading of data in an optimal fashion during disk drive operation.

In particular, during the testing of the disk drive, in order to determine optimal average optimization metrics for the selection of optimal filters, such as continuous time filters, for reading operations, the previously-described operations may be performed for a number of different tracks of the disk for a number of different data zones, ranging from the outer diameter (OD) of the disk to the inner diameter (ID) of the disk. As an example, twenty different tracks for twenty different data zones may be tested utilizing the previously-described metric value determination process to select optimal continuous time filters having optimal frequency selections for reading operations for each track of the disk.

With reference to FIG. 5, FIG. 5 is an example of VMM optimization metrics for data wedges stored in a table 500, according to one embodiment of the invention. In this example, VMM optimization metrics 505 for ten data wedges of a track are shown. Further, in this example, the VMM 505 metrics for each wedge 507 are calculated and stored. The track may be read sixteen times wherein each data read and VMM calculation is performed for a different continuous time filter (CTF) digital to analog converter (DAC) value 501. As can be seen in table 500, this may be done for CTF DAC values 0 though 15. As an example, at row 502, for a CTF DAC value of zero, VMM metric values 505 are calculated and stored for wedges 1 through wedge 10.

In accordance with the previously-described methodology, first and second portions of the VMM metric values 505 may be removed such that a remaining portion of optimization metric values remain and an average optimization metric value 520 for the remaining portion of the VMM optimization metric values may be calculated and stored. As previously described, any suitable value (e.g., 10%, 15%, 20%, etc.) of low and high value VMM metric values may be removed.

As can be seen in FIG. 5, in this example, for a given track, the track is read sixteen times for different CTF DAC values. Based upon this table of calculated VMM metric values 505, a best average optimization metric value is determined. In this example, the best average VMM optimization metric value measured is for row 530 in which the measurements were made with a CTF DAC value of 6. The average VMM optimization metric value for this track read is 890.625 (block 535). As an example, a bottom 10% VMM metric value of 880 may be removed and a high 10% VMM metric value of 899 may be removed in calculating the average optimization metric value 535.

Based upon the previously-described methodology, the best average optimization metric value calculated based upon the averaging of the VMM optimization metrics is set forth in row 530 with the lowest average optimization metric value being 890.625 (block 535) such that a CTF DAC value of 6 is determined to be optimal for that track.

Thus, for this track, during read back operations by the read/write channel, the DAC value for the continuous time filter (CTF) is set to 6 for selecting the most optimal CTF that has been determined to have an optimal frequency for performing the most accurate data reading operations on that track of the disk. The same or similar methodology may be applied to a pre-determined number of tracks for different data zones of the disk from the outer diameter (OD) of the disk to the inner diameter (ID) of the disk such that continuous time filters having the optimal frequency setting are selected to best read data for the majority of the tracks of the disk drive. This methodology may be implemented during the manufacture of the disk drive such that during subsequent disk drive operations optimal continuous time filters are utilized on a track-by-track basis to optimally read data from the disk of the disk drive.

It should be appreciated that embodiments of the invention may be implemented in the control circuitry of a disk drive including but not limited to the read/write channel, processor, servo controller, memory etc., and may operate under the control of a program or routine to execute methods or processes in accordance with the previously described embodiments of the invention.

For purposes of the present specification, it should be appreciated that the terms "processor", "controller", etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes described previously can be employed by a disk drive. However, other types of data storage devices with similar or other media format characteristics can be employed by those skilled in the art to use the invention with equal advantage to implement these techniques.

What is claimed is:

1. A disk drive comprising:
a disk comprising a plurality of tracks;
a head actuated over the disk; and
control circuitry operable to:
    write a target track including a plurality of data wedges;
    determine optimization metrics for the data wedges of the plurality of data wedges as the data wedges are read;
    store the optimization metrics for the data wedges from the target track;
    remove a first portion and a second portion of the optimization metrics such that a remaining portion of the optimization metrics remains, wherein the first portion of the optimization metrics removed is below a predetermined percentage of the optimization metrics and the second portion of the optimization metrics removed is above the predetermined percentage of the optimization metrics; and
    calculate an average optimization metric value for the remaining portion of optimization metrics for use in read channel optimization.

2. The disk drive as recited in claim 1, wherein the control circuitry includes an accumulator, the accumulator being reset each time a data wedge is read.

3. The disk drive as recited in claim 1, wherein the optimization metrics for the data wedges are determined during one revolution of reading the target track.

4. The disk drive as recited in claim 1, wherein the optimization metrics comprise a Viterbi margin metric (VMM).

5. The disk drive as recited in claim 1, wherein the optimization metrics comprise a means square error (MSE) metric.

6. The disk drive as recited in claim 1, wherein the predetermined percentage is approximately 10%.

7. The disk drive as recited in claim 1, wherein the predetermined percentage is approximately 15%.

8. The disk drive as recited in claim 1, wherein the optimization metrics for the data wedges are stored in a table.

9. The disk drive as recited in claim 1, wherein a track is read a plurality of times and for each track reading an average optimization metric for the data wedges is determined.

10. The disk drive as recited in claim 9, wherein an optimal average optimization metric is selected from the plurality of track reads for use in a continuous time filter.

11. A method of optimizing read channel operation for a disk drive, the disk drive comprising a disk and a head actuated over the disk, the method comprising:
    writing a target track including a plurality of data wedges to the disk;
    determining optimization metrics for the data wedges of the plurality of data wedges as the data wedges are read;
    storing the optimization metrics for the data wedges;
    removing a first portion and a second portion of the optimization metrics such that a remaining portion of optimization metrics remains, wherein the first portion of the optimization metrics removed is below a predetermined percentage of the optimization metrics and the second portion of the optimization metrics removed is above the predetermined percentage of the optimization metrics; and
    calculating an average optimization metric value for the remaining portion of the optimization metrics for use in read channel optimization.

12. The method as recited in claim 11, wherein determining the optimization metrics for the data wedges comprises accumulating data for each data wedge that is read and resetting an accumulator each time a data wedge is read.

13. The method as recited in claim 11, wherein the optimization metrics for the data wedges are determined during one revolution of reading the target track.

14. The method as recited in claim 11, wherein the optimization metrics comprise a Viterbi margin metric (VMM).

15. The method as recited in claim 11, wherein the optimization metrics comprise a means square error (MSE) metric.

16. The method as recited in claim 11, wherein the predetermined percentage is approximately 10%.

17. The method as recited in claim 11, wherein the predetermined percentage is approximately 15%.

18. The method as recited in claim 11, further comprising storing the optimization metrics for the data wedges in a table.

19. The method as recited in claim 11, further comprising reading a track a plurality of times and for each track reading determining an average optimization metric for the data wedges.

20. The method as recited in claim 19, further comprising selecting an optimal average optimization metric from the plurality of track reads for use in a continuous time filter.

* * * * *